US012435690B1

(12) United States Patent
Davis

(10) Patent No.: US 12,435,690 B1
(45) Date of Patent: Oct. 7, 2025

(54) KINETIC HYDROELECTRIC ENERGY PUMPED APPARATUS (KHEPA) MOTOR

(71) Applicant: Christopher George Davis, Aurora, CO (US)

(72) Inventor: Christopher George Davis, Aurora, CO (US)

(*) Notice: Subject to any disclaimer, the term of this patent is extended or adjusted under 35 U.S.C. 154(b) by 0 days.

(21) Appl. No.: 18/990,240

(22) Filed: Dec. 20, 2024

(51) Int. Cl.
*F03B 13/06* (2006.01)
*B60L 53/50* (2019.01)
*F03B 15/00* (2006.01)

(52) U.S. Cl.
CPC .......... *F03B 13/06* (2013.01); *F03B 15/005* (2013.01); *B60L 53/50* (2019.02); *F05B 2220/7068* (2013.01); *F05B 2260/422* (2020.08); *F05B 2260/85* (2013.01)

(58) Field of Classification Search
CPC ........ F03B 13/06; F03B 15/005; B60L 53/50; F05B 2220/7068; F05B 2260/422; F05B 2260/85
See application file for complete search history.

(56) References Cited

U.S. PATENT DOCUMENTS

2018/0100480 A1* 4/2018 Duquette ................. F03B 3/10

* cited by examiner

Primary Examiner — Joseph Ortega
(74) Attorney, Agent, or Firm — Plager Schack LLP; Mark H. Plager; Kara K. Verryt

(57) ABSTRACT

A kinetic hydroelectric energy pumped apparatus (KHEPA) motor for charging electric vehicles (EVs) or providing an off-grid power supply includes a robine in a housing; a battery; an inverter; a transformer; a voltage regulator; a pump-motor; a fluid tank; a fluid; a nozzle; a stator; a wiring harness; a relay; a fluid filler intake hose; pump hoses; a robine outtake hose; and a rectifier, with an optional starter pump. The KHEPA motor may include a central processing unit (CPU) operably connected to the battery, which incorporates the inverter, the transformer, the voltage regulator, and the relay. The robine includes a rotor water wheel, and a plurality of magnets configured to fit inside the stator. The pump conveys the fluid for delivery through the nozzle, rotating the robine and revolving the stator, thereby converting mechanical energy into electricity which may be used or stored in the battery for later use.

18 Claims, 12 Drawing Sheets

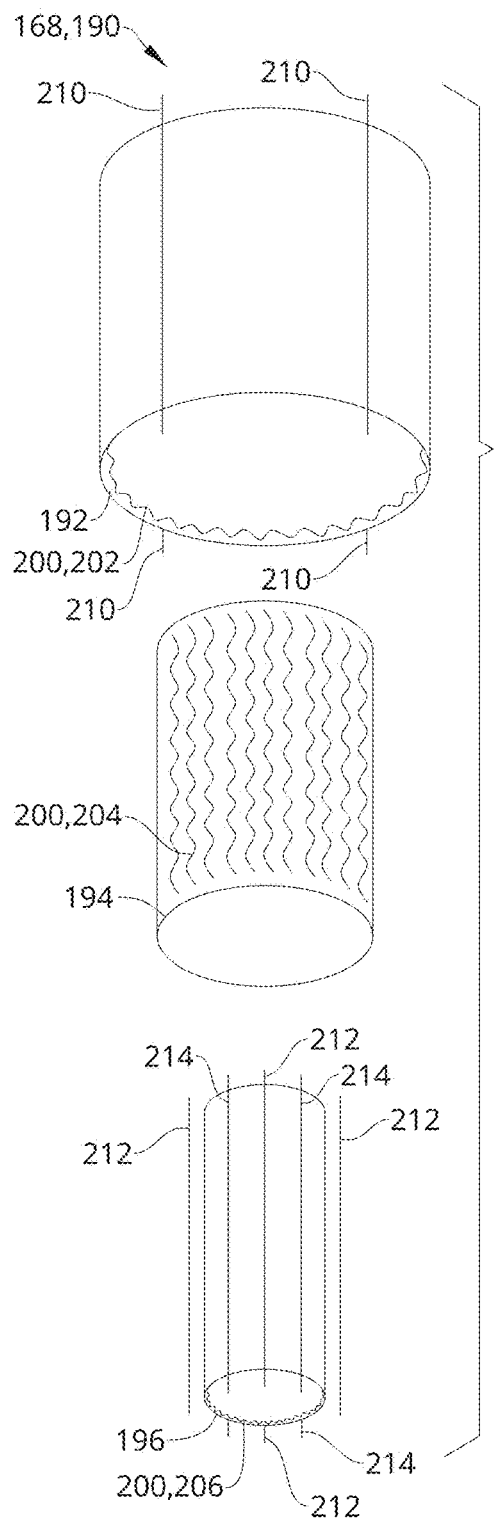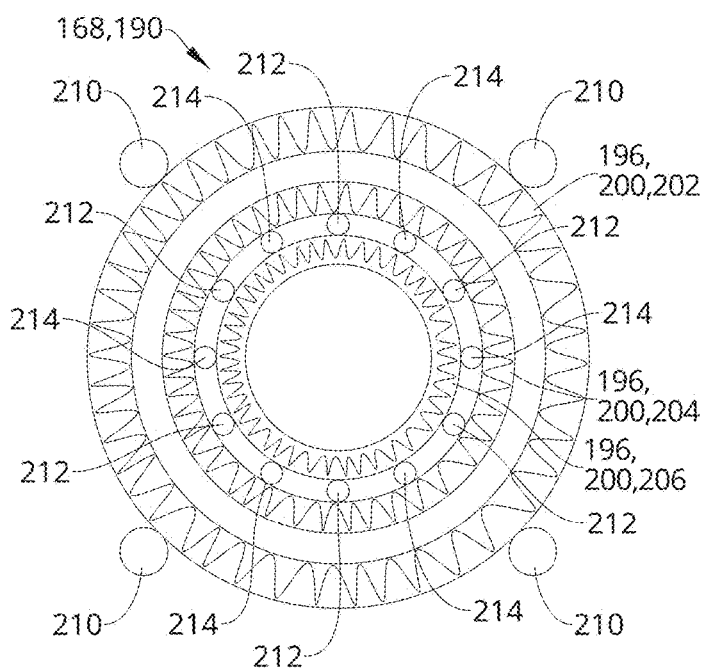
FIG.10
FIG.11

KINETIC HYDROELECTRIC ENERGY PUMPED APPARATUS (KHEPA) MOTOR

BACKGROUND

The embodiments herein relate generally to motors, and more particularly to a kinetic hydroelectric energy pumped apparatus (KHEPA) motor.

Electric vehicle (EV) charging ranges pose a problem. The average EV mileage between charges is about 250 miles; so EV owners must frequently recharge their EVs. Charging stations for EVs are not widely available. Moreover, EV owners must spend an inordinate amount of time at vehicle charging stations, first waiting in line to recharge their vehicles, and then to complete the slow recharging process which may take several hours.

Most generators for home use run on natural gas and other harmful toxicants.

A safe, simple, environmentally friendly, and user-friendly alternative is needed for recharging EVs, and for homeowners to have an off-grid power supply.

SUMMARY

Some embodiments of the present invention include a kinetic hydroelectric energy pumped apparatus (KHEPA) motor for charging EVs anywhere, and providing an off-grid power supply.

The KHEPA motor includes a robine (rotor turbine) in a housing; a battery; an inverter; a transformer; a voltage regulator; a pump-motor; a fluid tank; a fluid; a nozzle; a stator; a wiring harness; a relay; a fluid filler intake hose; pump hoses; a robine outtake hose; and a rectifier, with an optional starter pump. The KHEPA motor may include a CPU operably connected to the battery, which incorporates the inverter, the transformer, the voltage regulator, and the relay. The robine includes a rotor water wheel, and a plurality of magnets configured to fit inside the stator. The pump conveys the fluid for delivery through the nozzle, rotating the robine and revolving the stator, thereby converting mechanical energy into electricity which may be used or stored in the battery for later use.

BRIEF DESCRIPTION OF THE FIGURES

The detailed description of some embodiments of the invention is provided below with reference to the accompanying figures, wherein like numerals represent corresponding parts of the figures.

FIG. 10 is an exploded view of the triple stator;

FIG. 11 is a section view of the triple stator;

DETAILED DESCRIPTION OF CERTAIN EMBODIMENTS

Figure 1:
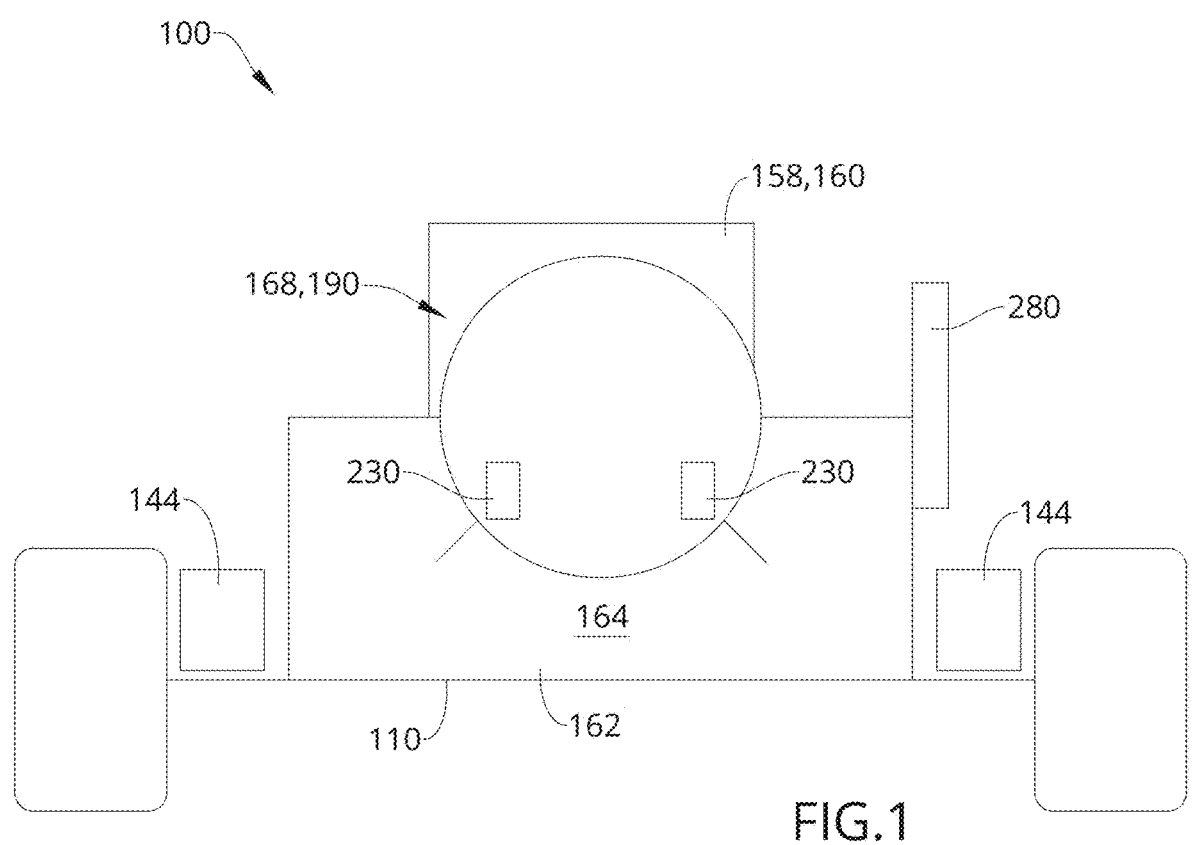
FIG. 1 is a schematic view of a triple stator invention in a chassis.
Figure 2:
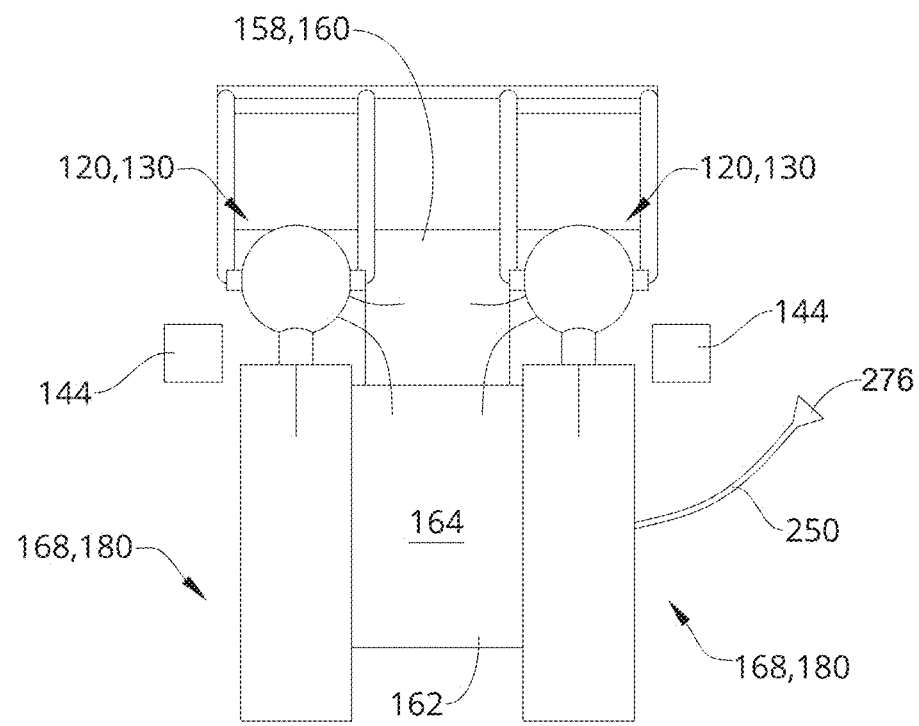
FIG. 2 is a schematic top view of a dual stator.
Figure 3:
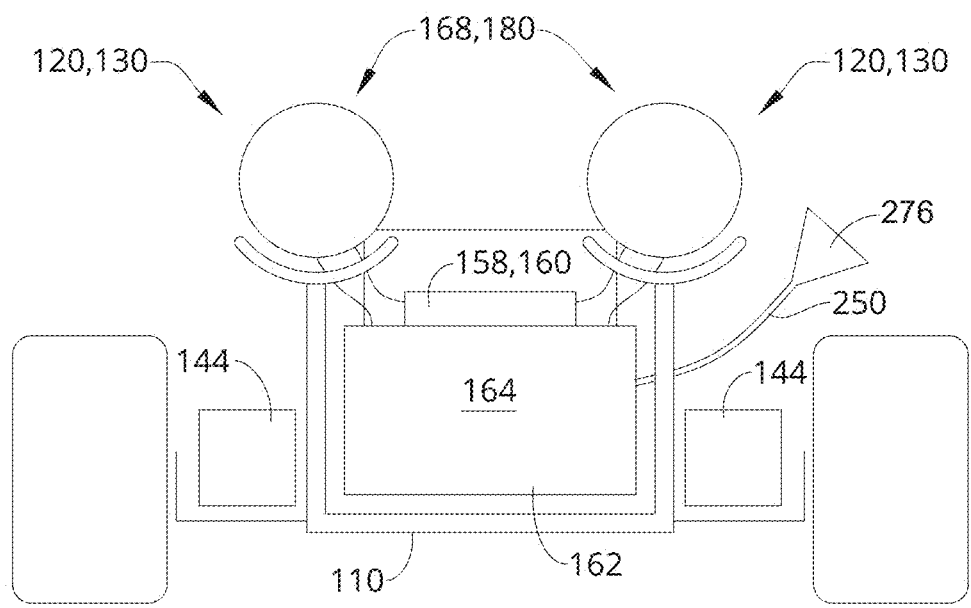
FIG. 3 is a schematic view of a dual stator invention in a chassis.
Figure 4:
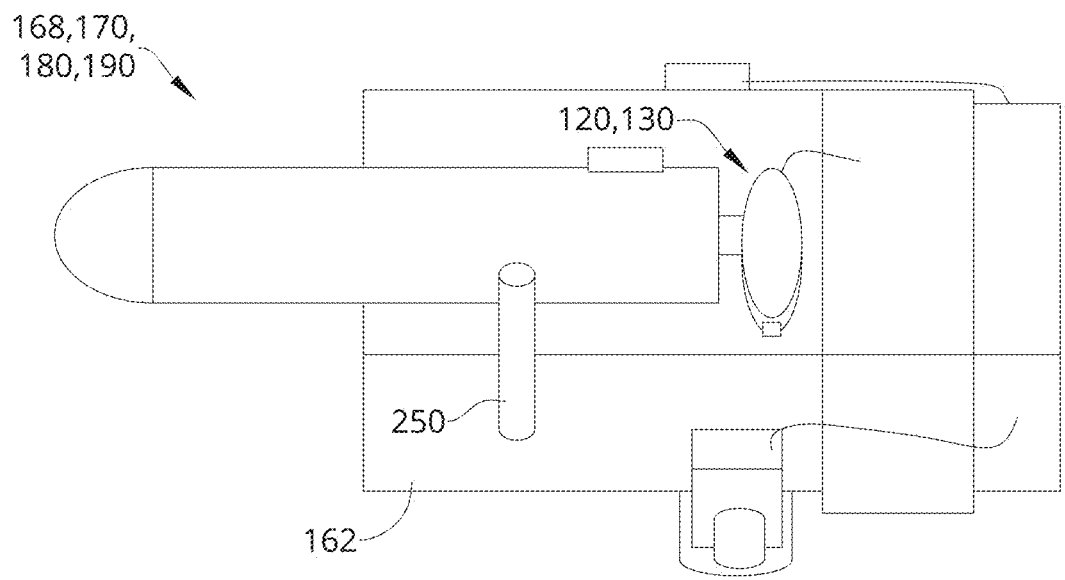
FIG. 4 is a top schematic view of a triple stator.

In the following detailed description of the invention, numerous details, examples, and embodiments of the invention are described. However, it will be clear and apparent to one skilled in the art that the invention is not limited to the embodiments set forth and that the invention can be adapted for any of several applications.

Referring now to FIGS. 1-21, in an exemplary embodiment, the present invention provides a kinetic hydroelectric energy pumped apparatus (KHEPA) motor 100. The KHEPA motor 100 includes at least one robine (rotor turbine) 120 housed in a robine housing 130 (best seen at FIGS. 8-9). Each robine 120 comprises a rotor-water wheel 122 located at a first housing side 132 and a plurality of magnets 126 at an outer robine 128 or at a second housing side 134. Each robine 120 also comprises four ball bearings 138 comprising a first ball bearing and a second ball bearing proximal to the first housing side 132, and a third ball bearing and a fourth ball bearing proximal to the second housing side 134. The ball bearings 138 are retained in a ball bearing housing 140 which may be associated with a steady bearing 340. The KHEPA motor 100 further comprises at least one battery 144; an inverter (or hybrid inverter) 148; a transformer (or step-up transformer) 150; a voltage regulator 152; at least one pump 158 having a pump motor 160 (hereinafter the pump-motor 158/160), such as an AC pump-motor 158/160 having a pump housing 158A; a fluid tank 162; at least one spray nozzle 166; at least one stator 168; at least one wiring harness 230; a relay (or relay-switch) 240; a fluid filler intake hose 250; at least one pump hose 260; a robine outtake hose 264; a starter pump 270; and a rectifier 280. The KHEPA motor 100 may include at least one central processing unit (CPU) 154 operably connected to the at least one battery 144. In some embodiments, the CPU may include the inverter 148, the transformer 150, the voltage regulator 152, and the relay 240. The at least one pump hose 182 may include a pump intake hose and a pump outlet hose. The KHEPA motor 100 may include a starter pump 270, such as a DC starter pump. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

Figure 5:
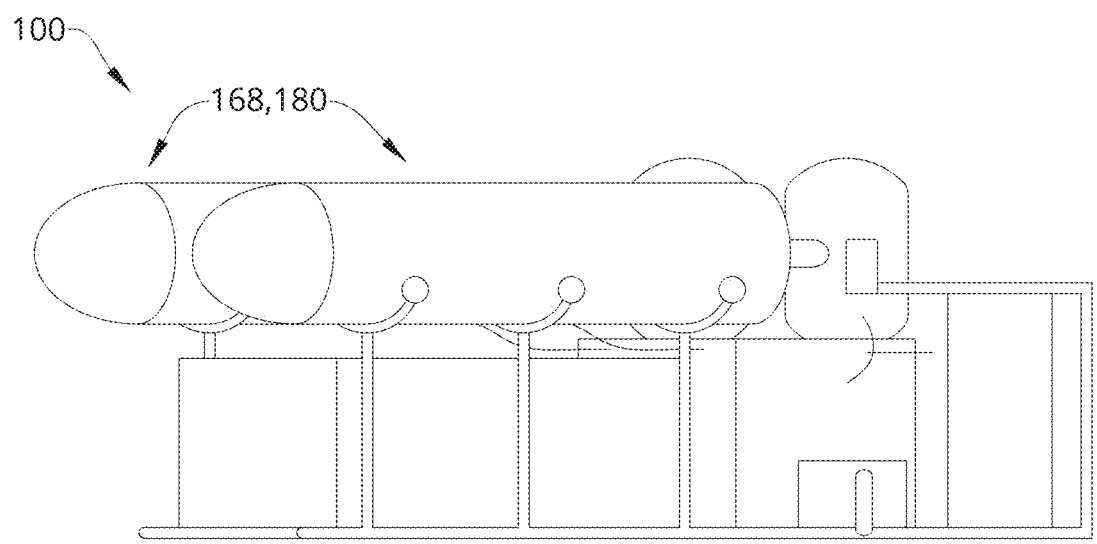
FIG. 5 is a schematic view of a dual stator.
Figure 6:
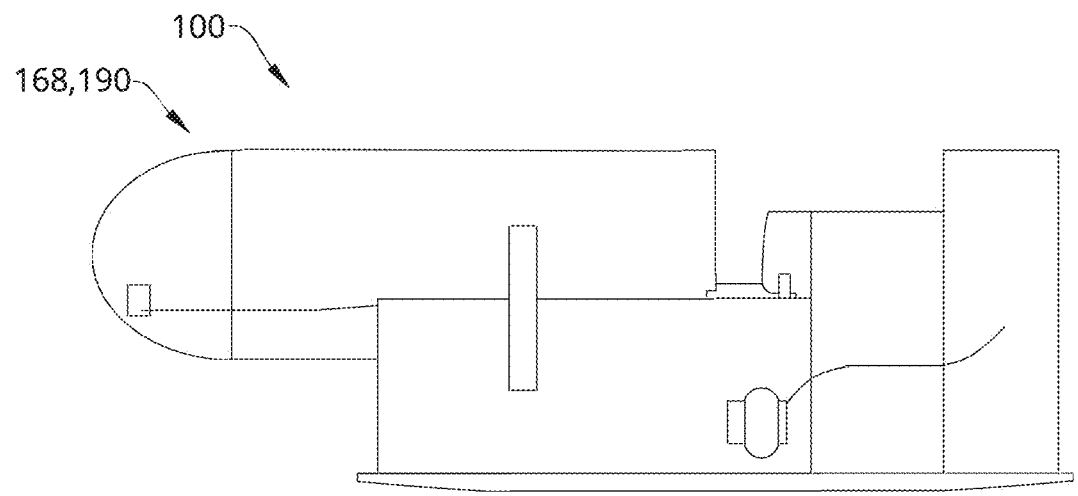
FIG. 6 is a schematic side view of a triple stator.
Figure 7:
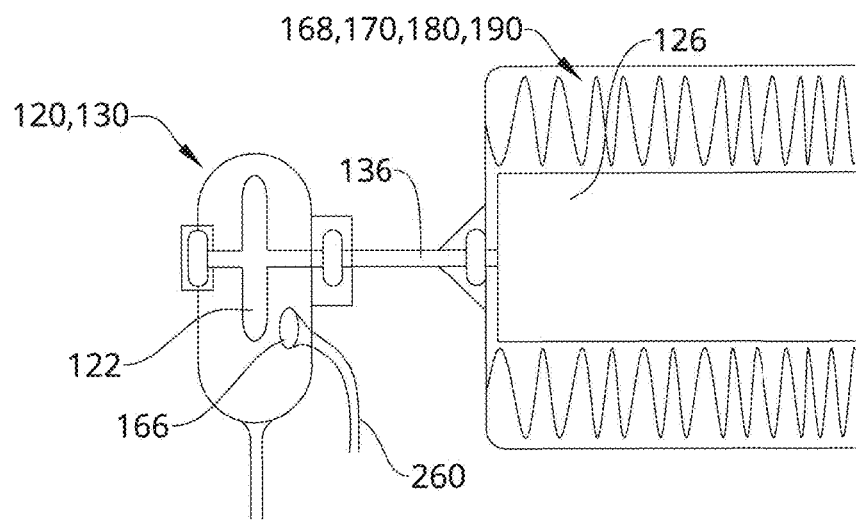
FIG. 7 is a schematic view of a single stator or a dual stator.
Figure 8:
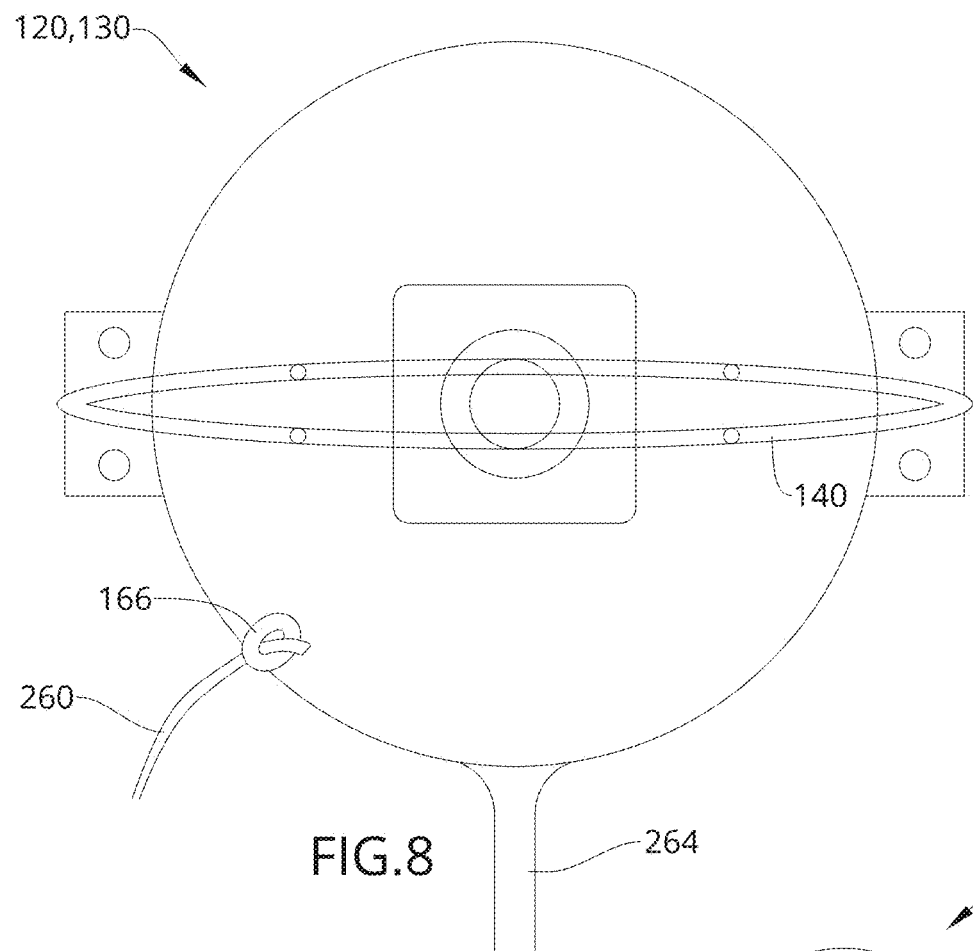
FIG. 8 is a is a schematic view of the robine water wheel housing.

The various elements of the KHEPA motor 100 may be related in the following exemplary fashion. It is not intended to limit the scope or nature of the relationships between the various elements. The following examples are presented as illustrative examples only. The KHEPA motor 100 may be mounted to a vehicle chassis 110, shown at FIGS. 1 and 3. The stator 168 may comprise a single stator 170 shown at FIG. 7, a double stator 180 comprising a first stator and a second stator as seen at FIGS. 5-7, or a triple stator 190 comprising a first stator, a second stator and a third stator, such as the outer stator 192, the intermediate stator 194 and the inner stator 196 as shown at FIGS. 1, 6, 10-12 and 15-16. FIG. 1 shows a stator 168 comprising a triple stator 190 and a robine 120 comprising a dual robine having an inner robine and an outer robine 128. As water pushes the rotor-water wheel 122, the inner robine rotates in the inner stator 196 creating electricity, while the outer robine 128 simultaneously spins between the intermediate and outer stators 194,192, creating electricity. The outer robine 128 has double sided magnets 126. Because the same fluid pressure used to rotate a single robine through a single stator 170 is used to rotate the triple stator 190, using the triple stator 190 produces more than double the electricity produced by a single stator 170. Using the steady bearing 340 that fits in-between the inner stator 196 and the intermediate stator 194 and slides into the hollow poles 212, ensures the magnets 126 of the inner robine and the outer robine 128 remain separated from the stators 168 and remain stable during assembly. The triple stator 190 improves efficiency for all stators, and may also be used for small wind turbines and small hydro turbines. Further, the pump/motor 158/160 may be configured to operate with a quad stator. As such, the KHEPA motor 100 may comprise a quad stator, which may comprise four single stators 170, four double stators 180, or four triple stators 190. If space permits, five stators may be included.

Some portions of the KHEPA motor 100 are described more fully with reference to FIGS. 10-17, which show a triple stator 190 and portions thereof, though these components are present in embodiments which include a single stator 170 and a double stator 180.

The rotor-water wheel 122 of each robine 120 is constructed and arranged to rotate in response to pressure (measured in PSI) of a fluid 164 conveyed by each pump-motor 158/160. The fluid 164 may comprise any suitable fluid, such as a 50/50 blend by volume of water and any type of anti-freeze, such as ethylene glycol. The fluid 164 travels from the fluid tank 162 through each pump hose 182 to the robine housing 130 for delivery through each spray nozzle 166 proximal to the rotor-water wheel 122. The fluid 164 exits each spray nozzle 166 within one to three inches of the rotor-water wheel 122 at a pressure of at least 100 PSI, which causes the rotor-water wheel 122 and the entire robine 120 to spin. After the fluid contacts and pushes the rotor-water wheel 122, the fluid 164 exits the bottom of the robine 120 through the outtake hose 264 and is returned to the fluid tank 162. The plurality of magnets 126 of each robine 120 are configured to fit inside each stator 168. In response to the rotation of each robine 120, each stator 168 revolves. The revolutions of each stator 168 convert the mechanical energy into electricity. Greater fluid pressure may be provided by each pump-motor 158/160, which will result in faster revolutions of the rotor-water wheel 122, which together with the relay 240, enables the KHEPA motor 100 to supply increased watts and voltage. Once the KHEPA motor 100 is creating electricity, the relay 240 will be actuated to switch the pump/motor 158/160 from being powered by the battery 144 to being powered by the stator 168. The KHEPA motor 100 may be connected to and power any suitable device. In some embodiments, a triple stator may be beneficially used instead of two separate stators to use the full fluid pressure of up to 800 PSI provided by the pump-motor 158/160.

Each battery 144 may store the power generated by the KHEPA motor 100 until it is needed and may start the pump-motor 158/160 of the KHEPA motor 100. The KHEPA motor 100 may be remotely actuated to start by an app on a smart phone or another remote control device, or may be actuated by a manual switch operably connected to the inverter 148 configured to draw electricity from each battery 144 to the transformer 150 to boost the voltage to the voltage regulator 152 to supply power to start the pump-motor 158/160.

Figure 9:
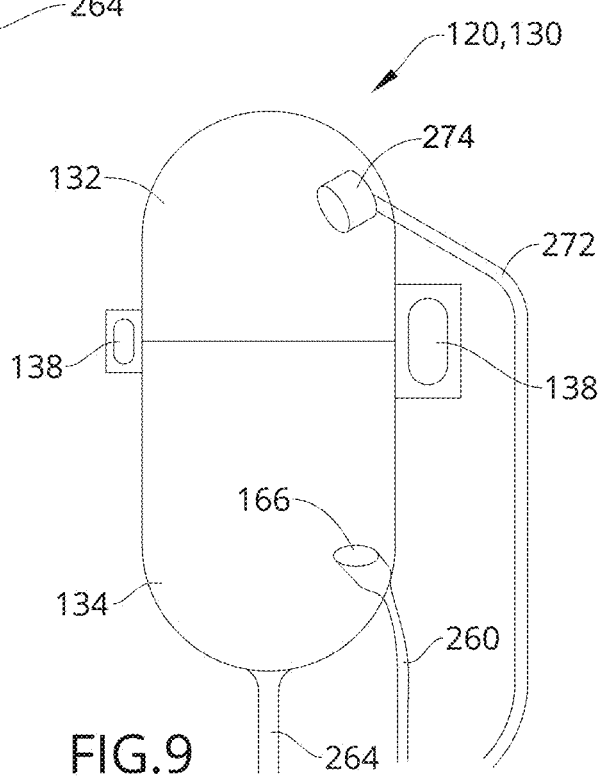
FIG. 9 is a side schematic view of the robine housing.
Figure 12:
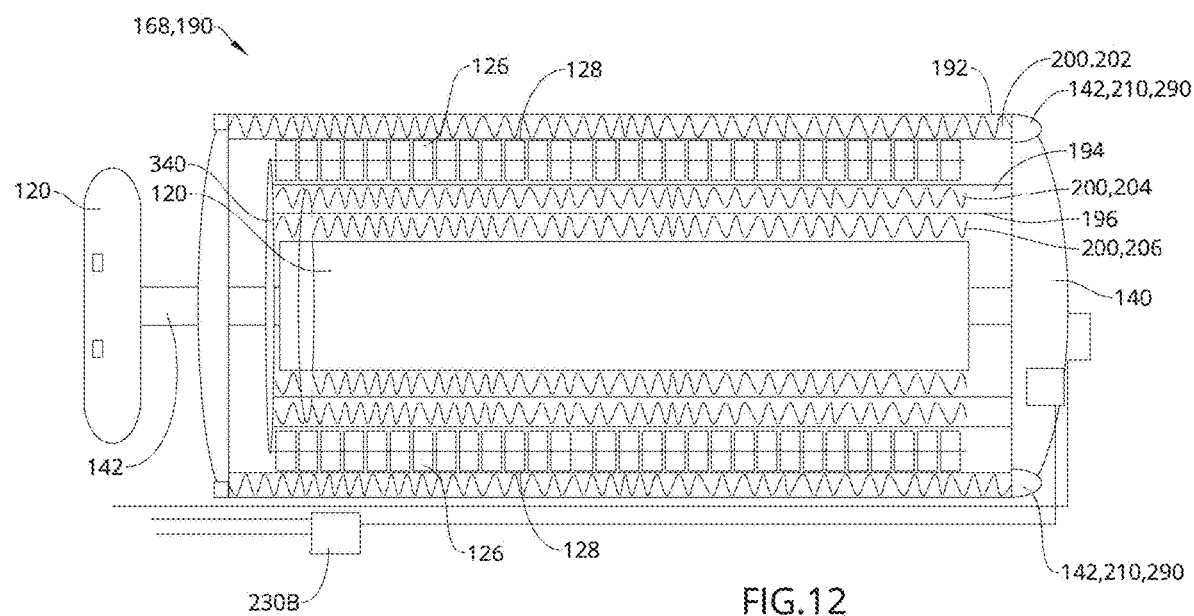
FIG. 12 is a schematic view of the triple stator.
Figure 13:
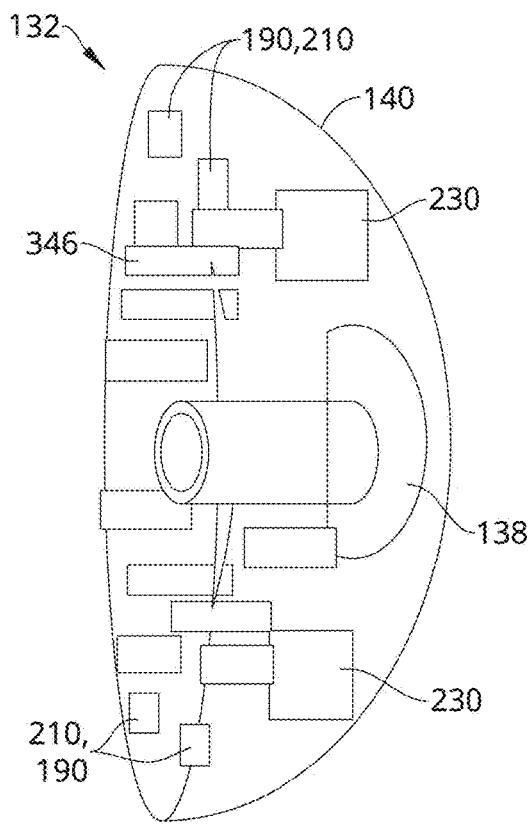
FIG. 13 is a schematic view of the ball bearing housing.
Figure 14:
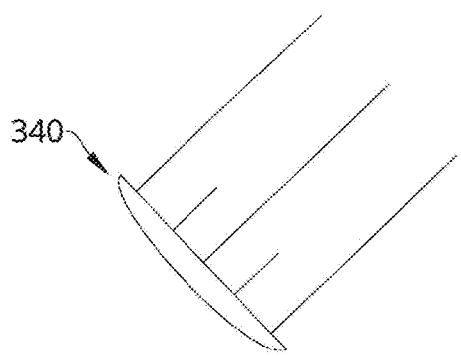
FIG. 14 is a schematic view of the steady bearing.
Figure 15:
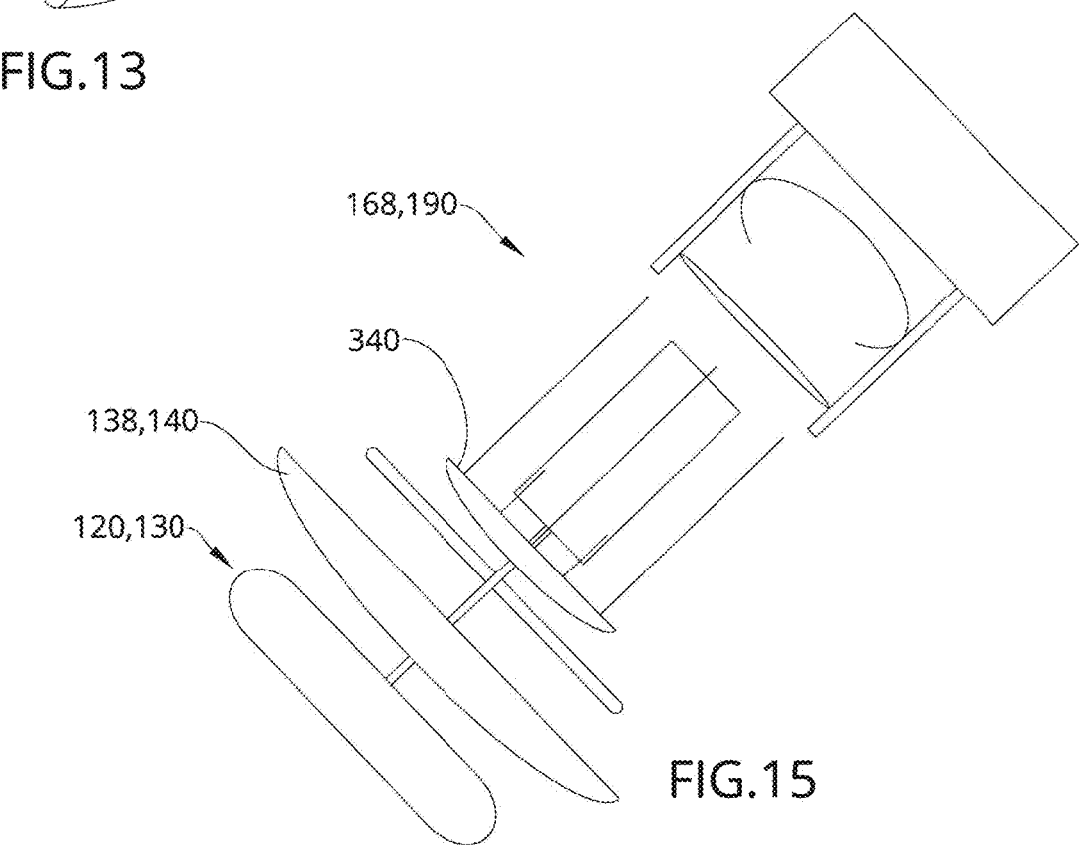
FIG. 15 is a schematic view of the triple stator.
Figure 16:
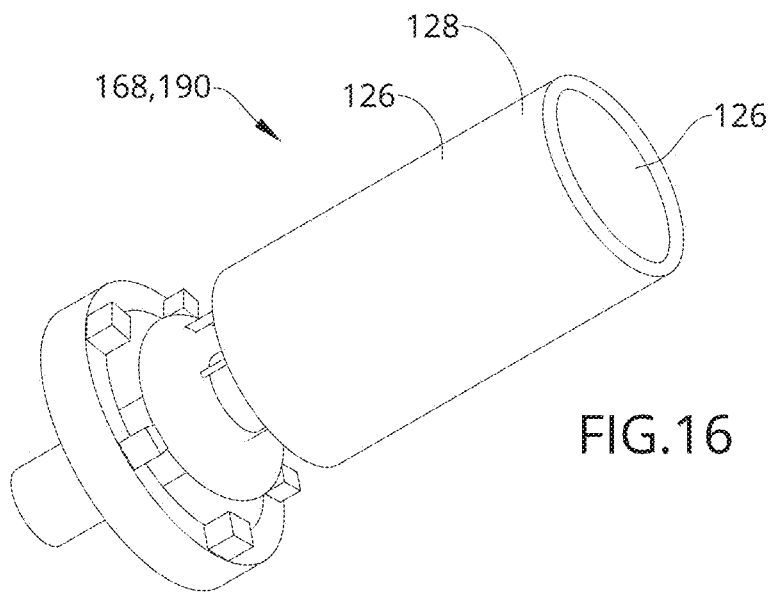
FIG. 16 is a schematic view of the outer robine triple stator.
Figure 17:
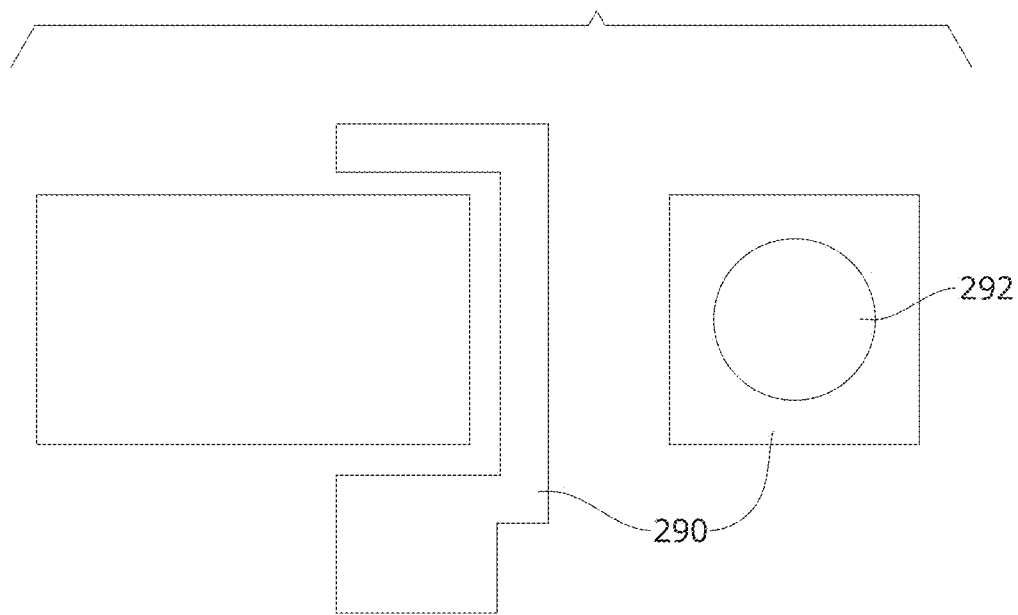
FIG. 17 is a schematic view of the screw connections.
Figure 18:
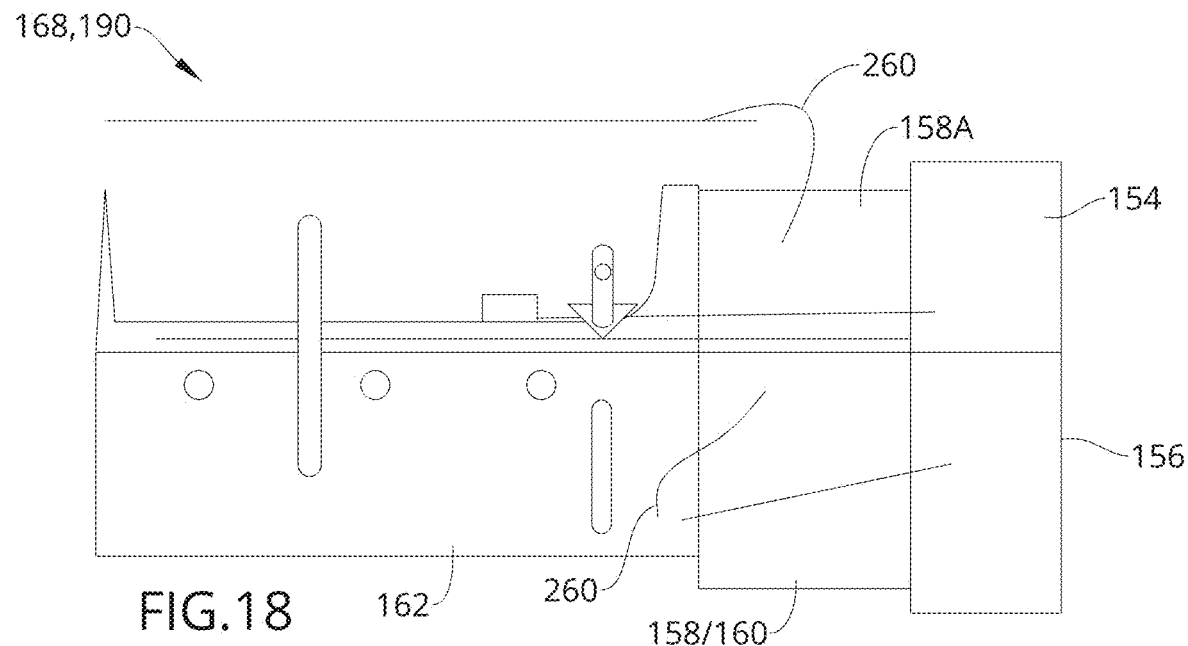
FIG. 18 is a schematic view of the fluid tank wiring triple stator.
Figure 19:
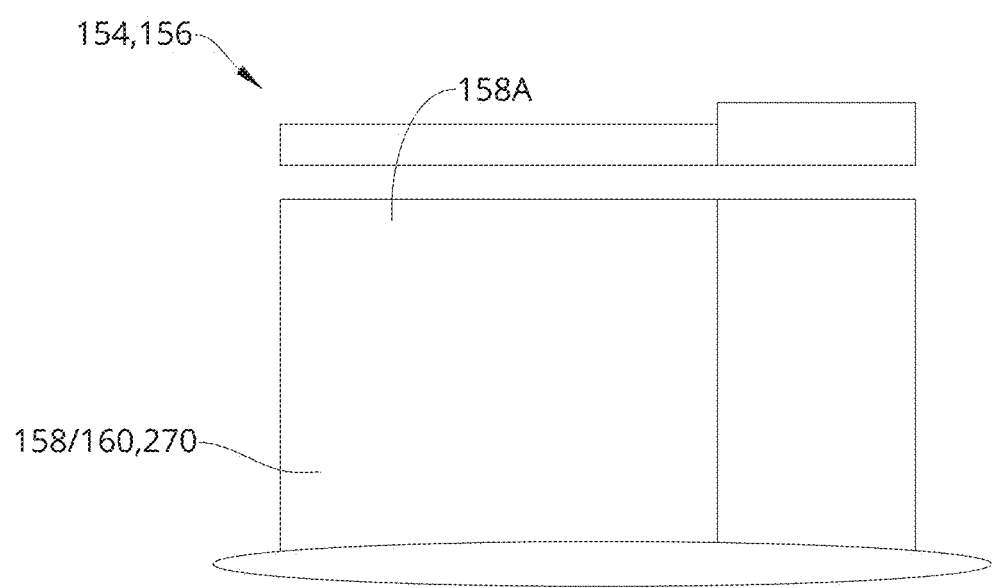
FIG. 19 is a schematic view of box construction.
Figure 20:
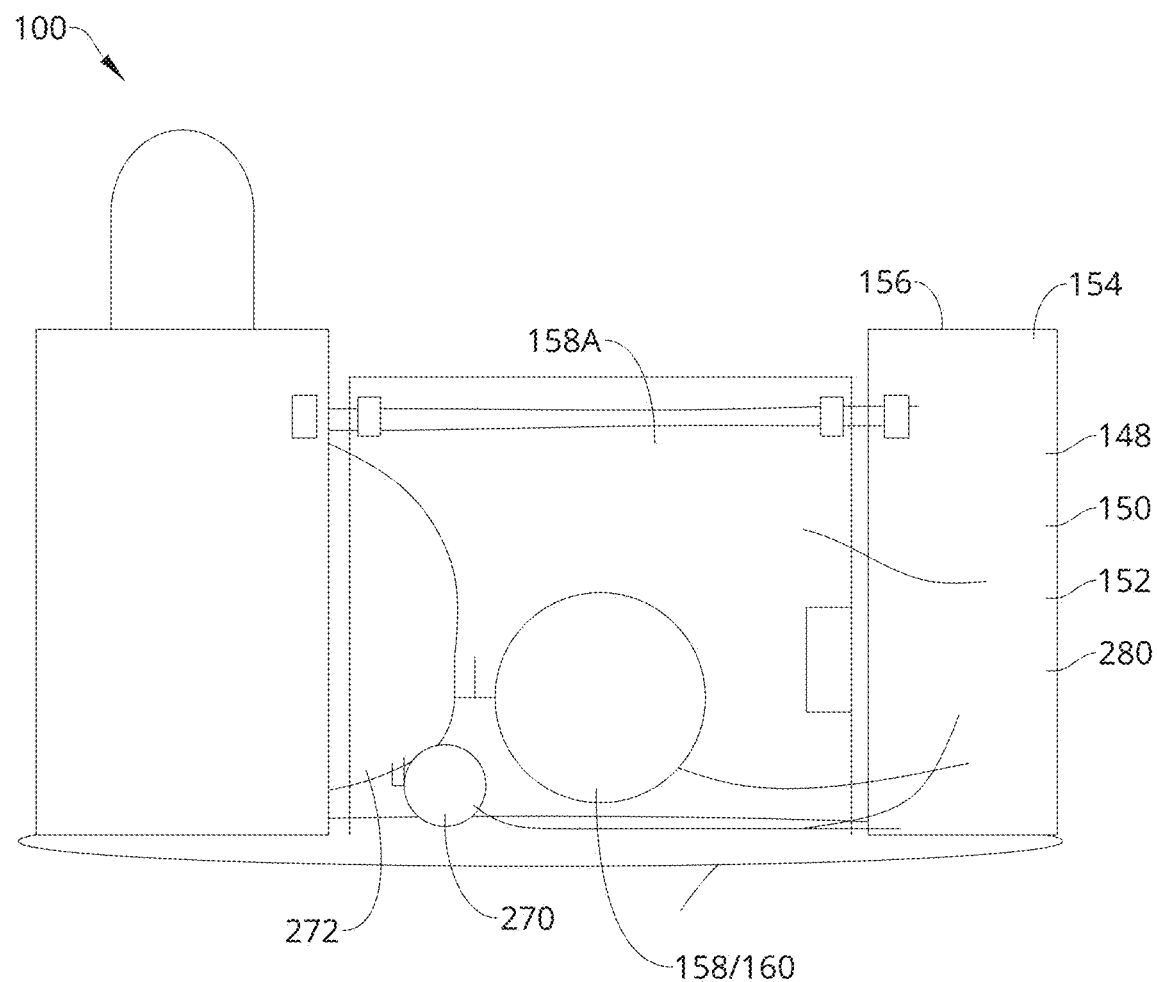
FIG. 20 is a schematic view of the peripheral components.
Figure 21:
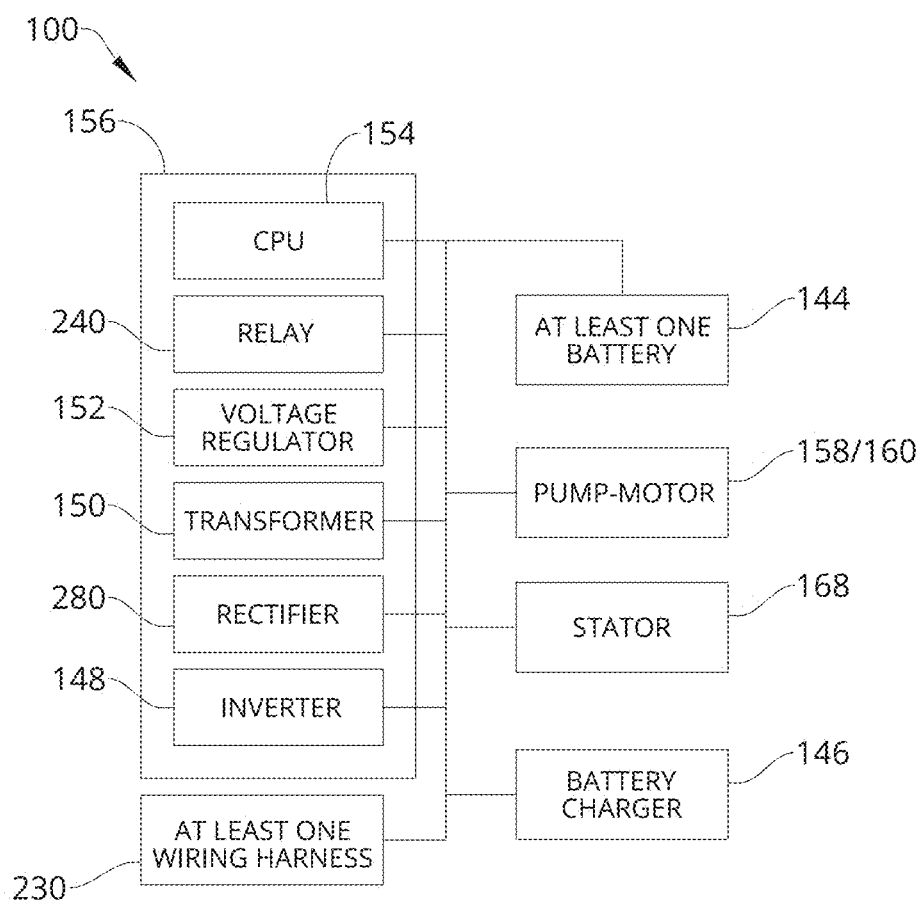
FIG. 21 is a schematic diagram of components of the invention.

Referring to FIGS. 9, 19 and 20, some embodiments of the KHEPA motor 100 may include the starter pump 270 (shown at FIGS. 19-20), which is operable to start the pump-motor 158/160. The starter pump 270 may be DC-powered. The starter pump 270 is in fluid communication with a starter pump hose 272 and a starter pump nozzle 274 (shown at FIG. 9), and is operably connected to each robine 120 and each battery 144. The starter pump 270 is configured to actuate and rotate each robine 120 to operate the KHEPA motor 100 until the stator has converted sufficient mechanical energy to store power in each battery 144 and to increase the voltage sufficiently to start the pump-motor 158/160. Once the pump-motor 158/160 is started, it will pull fluid 164 from the fluid tank 162 to the robine housing 130 for the KHEPA motor 100 to operate as described hereinabove.

All wiring harnesses 230 are operably connected to and flow to the CPU, which includes voltage regulators and will distribute electricity to the rectifier, which will change the electricity from AC to DC to charge the batteries.

The plurality of wiring harnesses 230 may include additional wiring harnesses which may be connected to an electric vehicle (EV) to power an EV motor or charge a large EV battery bank. As such, EVs with existing battery banks will not need batteries or an external charger. In some embodiments a system of batteries may include a plurality of cells configured to charge and a plurality of cells configured to simultaneously power the vehicle.

The KHEPA motor 100 may include a fluid level indicator operably connected to a sensor. When the level of fluid 164 in the fluid tank 162 drops below a predetermined level, the fluid level indicator will actuate the sensor to provide an alert, and to activate the fluid filler intake hose 250 to refill the fluid tank 162 with fluid 164.

The KHEPA motor 100 provides a self-governing hydro-electric generator capable of operating to power itself, and to power any device to which it is attached, including EV battery cells and home power generators. In one example, the EV battery cells of an existing EV may be wired to the pump-motor 158/160 to send voltage to the pump-motor 158/160 or to the DC starter pump 190. The KHEPA motor 100 may be configured to send the voltage to the transformer 150 located in the CPU 154 along with the voltage regulator 152 and the inverter 148 for DC to AC power. Once the pump-motor 158/160 is powered, fluid 164 is pulled from the fluid tank 162 and conveyed to the robine housing 130.

The stator 168 may be wired to apply electricity (AC) to multiple devices and/or applications, such as the pump-motor 158/160. The stator 168 may comprise large copper windings configured to maximize surface area and maximize wattage. With the revolutions of the robine 120 through the stator 168, the stator 168 is configured to create electricity and is operably connected to the second wiring harness 230B proximal to the robine housing 130 to generate power which may be supplied to the AC pump-motor 158/160. The wires of the second wiring harness 230B travel to and are connected to the CPU 154 and are operably connected to the voltage regulator 152 and the relay 240. The relay 240 will send a message to stop drawing power from the battery 144 and start getting power from the stator 168, so the KHEPA motor 100 may then seamlessly run itself. In embodiments including a DC starter pump 190, the rectifier 280 is operably connected to the DC starter pump 190. The second wiring harness 230B may be proximal to the robine housing 122 and wired to the rectifier 280, to the relay 240, and then to the AC pump-motor 158/160 so the AC pump-motor 158/160 will not be powered by the at least one battery 144 but by the at least one stator 168. The second wiring harness 230B may be used to recharge the at least one battery if the device to which the KHEPA motor 100 is connected is not an existing EV with large battery storage.

In some embodiments of the KHEPA motor 100, the at least one stator 168 may comprise a plurality of stators 168 which may charge a plurality of large battery packs for existing EVs or for conversions which may be mounted in wheel transmissions. Certain battery cells of the plurality of battery cells may be charging while other battery cells of the plurality of battery cells may be powering a vehicle, and the KHEPA motor 100 may be configured to switch between using a set of fully charged battery cells and charging or recharging a set of battery cells that were just used. This configuration would enable a user to go on a road trip and stop only for non-power related issues.

The KHEPA motor 100 may be made by customizing a depth and a length of the fluid tank 162 depending on the make and model of a specific vehicle. The fluid filler intake hose 250 may be attached to the fluid tank 162 by a pipe clamp, such as a circular metal clamp built onto the external surface of the fluid tank 162. The fluid filler intake hose 250 may have a funnel 276 attached at a top hose end, and may provide about six inches of extra slack so when a user opens a refill door similar to a vehicle fuel door, the funnel 276 and fluid filler intake hose 250 may be pulled out and replacement fluid may be poured into the fluid tank 162. The fluid tank 162 may be operably connected to a sensor configured to provide an alert when the fluid level is low. The robine housing outtake hose 264 may be made of rubber, fed by gravity, and attached by a pipe clamp to a 2-in circular metal pipe built on an external surface of the fluid tank 162. The pipe may have any suitable length and diameter. The pump intake hose 260 may be attached by, for example, either a snap fit or screwing it into an external threaded connection. In some embodiments, the starter pump 270 may have a starter pump hose 272 provided with a cooling mechanism. The pump-motor 158/160 and the CPU 154 may be housed in a temperature-controlled box 156. A thermostat 244 may be housed in or attached to the temperature-controlled box 156. If the temperature rises or falls to a value outside of a predetermined optimal operating temperature range, the thermostat 244 may automatically start a heater or a cooler to maintain the temperature within the predetermined optimal operating temperature range. The pump-motor 158/160 may be mounted by bolts to a vehicle chassis 110 or the fluid tank 162. The relay 240, a plurality of ground wire connectors, and the CPU 154 incorporating the inverter 148, the transformer 150, the voltage regulator 152, may be mounted inside the temperature-controlled box 156, which may be screwed in place. The spray nozzle 166 may be affixed to the inside of the robine housing 130. The at least one pump hose 260 may comprise a pump outlet hose, which extends from the pump-motor 158/160 to the spray nozzle 166, and may be screwed in externally. The first housing side 132 and the second housing side 134 of the robine housing 130 may be secured together by fasteners, such as 8 bolts, 8 nuts, and 8 washers. The robine housing 130 may be made of stainless steel or plastic.

In some embodiments, the rotor-water wheel 122 of the robine 120 may comprise a rotor and a water wheel further comprising a disk and between 20 and 30 spaced scoops fixed thereto (in succession about 1.5 inches apart). The disk may be made of steel or stainless steel, in the same casting as the rotor. Each scoop may be made of a plastic composite, and may require small nuts and bolts or other suitable fixation means for connection to the disk. The stainless steel rotor and the water wheel are operably connected to two ball bearings 138 housed at ball bearing housings 140 located at both ends of the robine housing 130. The rotor-water wheel 122 may be welded to a bar 136 with the plurality of electromagnets 126 configured to fit inside of the stator 168 to complete the robine 120. In some embodiments, such as embodiments including a triple stator 290, the ball bearing housings 140 may be associated with a steady bearing 340. In use, the stator 168 may be operably connected by a wiring harness 230 to power one or many devices or applications. Before welding the components of the robine 120, a last ball bearing inside a stator cover 170 may be slid onto the rotor and welded into one piece configured to be placed into the stator 168, which may be bolted or screwed together.

With particular reference to FIGS. 10-15, the triple stator 190 comprises an outer stator 192, an intermediate stator 194, and an inner stator 196, and copper wiring 200 comprising copper windings. The copper wiring 200 may comprise outer copper wiring 202, intermediate copper wiring 204, and inner copper wiring 206. The triple stator 190 may comprise a plurality of solid support bars 142, including the outer metal stator bars 210 fastened together with fasteners 290 having fastener screw holes 292. The triple stator 290 includes hollow inner pipes 212 configured to provide conduits for electrical wiring operably connected to the copper wiring 200 and the at least one wiring harness 230. The triple stator may also include solid inner pipe 214 configured to provide structure and connection to the steady bearing 340 and the ball bearing housing 140.

The KHEPA motor 100 and its components may have any suitable size and dimensions. In some embodiments, the triple stator 190 may have a length of between 2.5 feet and 4.0 feet.

In some embodiments, the robine 120 may have an alternative configuration wherein the robine 120 is constructed and arranged to push a bar side to side, and the bar is operably connected to a plurality of chains that are configured to pull a plurality of stators, instead of rotating a stator, as described hereinabove.

The KHEPA motor 100 may be used in a number of applications, such as for charging and powering EVs, in vehicles with an internal combustion engine modified to add the KHEPA motor 100 to drive for months without refueling; and as a self-governing hydroelectric generator capable of powering itself and everything to which it is attached. The KHEPA motor 100 may be configured to power a house, an office building, an apartment community, electrical appliances, food trucks, electric vehicles, electric sea vessels, electric airplanes, electric trains, or any device or application that requires electricity or power to operate. The KHEPA motor 100 may be used to provide temporary power in storm-affected areas and post-disaster recovery areas.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. A kinetic hydroelectric energy pumped apparatus (KHEPA) motor capable of generating and storing electrical energy, the KHEPA motor comprising:
- a robine housed in a robine housing, wherein the robine comprises:
  - a rotor water wheel assembly located in the robine housing, the rotor water wheel assembly being constructed and arranged to rotate in response to fluid pressure;
  - a plurality of magnets carried by the robine housing; and
  - a plurality of ball bearings proximal to the robine housing;
- at least one stator configured to be actuated by rotation of the robine;
- at least one battery capable of storing electrical energy generated by the KHEPA motor, and starting the KHEPA motor;
- an inverter operably connected to the at least one battery, the inverter being configured to draw electricity from the at least one battery;
- a transformer operably connected to the inverter, the inverter being configured to convey electricity to the transformer;
- a voltage regulator operably connected to the transformer;
- at least one pump-motor operably connected to the at least one stator;
- a fluid tank configured to retain a fluid, the fluid tank being operably connected to the at least one pump-motor;
- at least one pump hose in fluid communication with the fluid tank, the at least one pump hose being configured to convey the fluid in response to operation of the at least one pump-motor;
- at least one spray nozzle in fluid communication with the at least one pump hose, the at least one spray nozzle being proximal to the rotor water wheel assembly and being configured to convey the fluid from the at least one pump hose to deliver the fluid to the rotor water wheel assembly at a fluid pressure sufficient to cause the rotor water wheel assembly to rotate and the robine to spin in response to the fluid pressure;
- a robine outtake hose operably connected to the robine housing and configured to convey the fluid delivered by the at least one spray nozzle from the robine, the robine outtake hose being constructed and arranged to return the fluid to the fluid tank;
- at least one wiring harness operably connected to the at least one stator and to the voltage regulator;
- a relay operably connected to the voltage regulator and to the at least one pump-motor; and
- a rectifier operably connected to the at least one wiring harness and to the relay;

wherein the plurality of magnets of the robine are configured to fit inside the stator, whereby in response to spinning of the robine, the stator revolves, converting mechanical energy into electrical power;
wherein the KHEPA motor is constructed and arranged to be connected to an electrically powered device to provide electrical power to the electrically powered device; and
wherein the KHEPA motor is configured to store electrical power in the at least one battery for later use.

2. A kinetic hydroelectric energy pumped apparatus (KHEPA) motor capable of generating and storing electrical energy, the KHEPA motor comprising:
- at least one robine housed in a robine housing, the robine housing having a first housing side and a second housing side, wherein the at least one robine comprises:
  - a rotor water wheel assembly located at the first housing side, the rotor water wheel assembly being constructed and arranged to rotate in response to fluid pressure;
  - a plurality of magnets located at the second housing side;
  - a first ball bearing and a second ball bearing proximal to the first housing side; and
  - a third ball bearing and a fourth ball bearing proximal to the second housing side;
- at least one stator operably connected to the robine, the at least one stator being constructed and arranged to be actuated by rotation of the at least one robine;
- at least one battery capable of storing electrical energy generated by the KHEPA motor and starting the KHEPA motor;
- an inverter operably connected to the at least one battery, the inverter being configured to draw electricity from the at least one battery;
- a transformer operably connected to the inverter, the inverter being configured to convey electricity to the transformer;
- a voltage regulator operably connected to the transformer;
- at least one pump-motor operably connected to the at least one stator;
- a fluid tank configured to retain a fluid, the fluid tank being operably connected to the at least one pump motor;
- at least one pump hose in fluid communication with the fluid tank, the at least one pump hose being configured to convey the fluid in response to operation of the at least one pump-motor;
- at least one spray nozzle in fluid communication with the at least one pump hose, the at least one spray nozzle being proximal to the rotor water wheel assembly of the at least one robine and being configured to convey the fluid from the at least one pump hose to deliver the fluid to the rotor water wheel assembly of the at least one robine at a fluid pressure sufficient to cause the rotor water wheel assembly of the at least one robine to rotate and the at least one robine to spin in response to the fluid pressure;
- a robine outtake hose operably connected to the robine housing and configured to convey the fluid delivered by the at least one spray nozzle from the at least one robine, the robine outtake hose being constructed and arranged to return the fluid to the fluid tank;
- a fluid filler intake hose configured for use to refill the fluid tank;
- at least one wiring harness operably connected to the at least one stator and to the voltage regulator;
- a relay operably connected to the voltage regulator and to the at least one pump-motor; and
- a rectifier operably connected to the at least one wiring harness and to the relay;

wherein the plurality of magnets of the robine are configured to fit inside the stator, whereby in response to spinning of the robine, the stator revolves, converting mechanical energy into electrical power;
wherein the KHEPA motor is constructed and arranged to be connected to a device to provide electrical power to the device; and
wherein the KHEPA motor is configured to store electrical power in the at least one battery for later use.

3. The KHEPA motor of claim 2, further comprising at least one central processing unit (CPU) operably connected to the at least one battery and to the at least one wiring harness, wherein the inverter, the transformer, the voltage regulator, and the relay are integrated in the CPU.

4. The KHEPA motor of claim 2, further comprising a starter pump operably connected to the at least one robine, the starter pump being configured to actuate and rotate the at least one robine to revolve the at least one stator and convert mechanical energy into electrical power to provide power directly from the at least one stator to the at least one pump-motor to start the KHEPA motor.

5. The KHEPA motor of claim 4, wherein the at least one wiring harness comprises:
a first wiring harness located on a bottom surface of the at least one stator; and
a second wiring harness proximal to the robine housing.

6. The KHEPA motor of claim 5, wherein the second wiring harness is wired to the rectifier, the rectifier is wired to the relay, and the relay is wired to the pump motor, whereby the pump motor is powered by the at least one stator.

7. The KHEPA motor of claim 5, wherein the second wiring harness is wired to the voltage regulator, the voltage regulator is wired to the relay, and the relay is wired to the at least one pump-motor, whereby the at least one pump-motor is powered by the at least one stator.

8. The KHEPA motor of claim 5, wherein the at least one stator comprises one stator.

9. The KHEPA motor of claim 5, wherein the at least one stator comprises a double stator comprising a first stator and a second stator.

10. The KHEPA motor of claim 5, wherein the at least one stator comprises a triple stator comprising a first stator, a second stator and a third stator.

11. The KHEPA motor of claim 10, wherein:
the ball bearing housing is located in a steady bearing;
the first wiring harness is located on a bottom surface of the triple stator;
the triple stator further comprises:
an outer stator, an intermediate stator, and an inner stator;
copper wiring comprising outer cooper wiring located in the outer stator, intermediate copper wiring located in the intermediate stator, and inner copper wiring located in the inner stator;
a plurality of hollow inner pipes configured to conduits for electrical wiring operably connected to the copper wiring and the at least one wiring harness; and
a plurality of solid inner pipes configured to provide structure to the triple stator, the plurality of solid inner pipes further being constructed and arranged for connection to the steady bearing and the ball bearing housing located therein.

12. The KHEPA motor of claim 2, wherein the fluid comprises 50% water and 50% of an anti-freeze solution by volume.

13. The KHEPA motor of claim 2, wherein:
the relay is operably connected to the inverter;
the inverter is operably connected to the at least one battery and to the transformer, the inverter being configured to draw electricity from the at least one battery and convey the electricity to the transformer; and
the transformer is configured to boost a voltage to the voltage regulator to supply power to start the at least one pump-motor to start the KHEPA motor.

14. The KHEPA motor of claim 13, wherein the relay is configured to be remotely actuated by a remote control unit to start the KHEPA motor.

15. The KHEPA motor of claim 13, wherein the relay is configured to be actuated by a manually operable switch.

16. The KHEPA motor of claim 2, further comprising a fluid filler intake hose configured for use to refill the fluid tank.

17. The KHEPA motor of claim 2, wherein the fluid pressure is at least 100 PSI.

18. The KHEPA motor of claim 2, wherein the fluid pressure is between 100 PSI and 800 PSI.

* * * * *